Patented Mar. 4, 1930

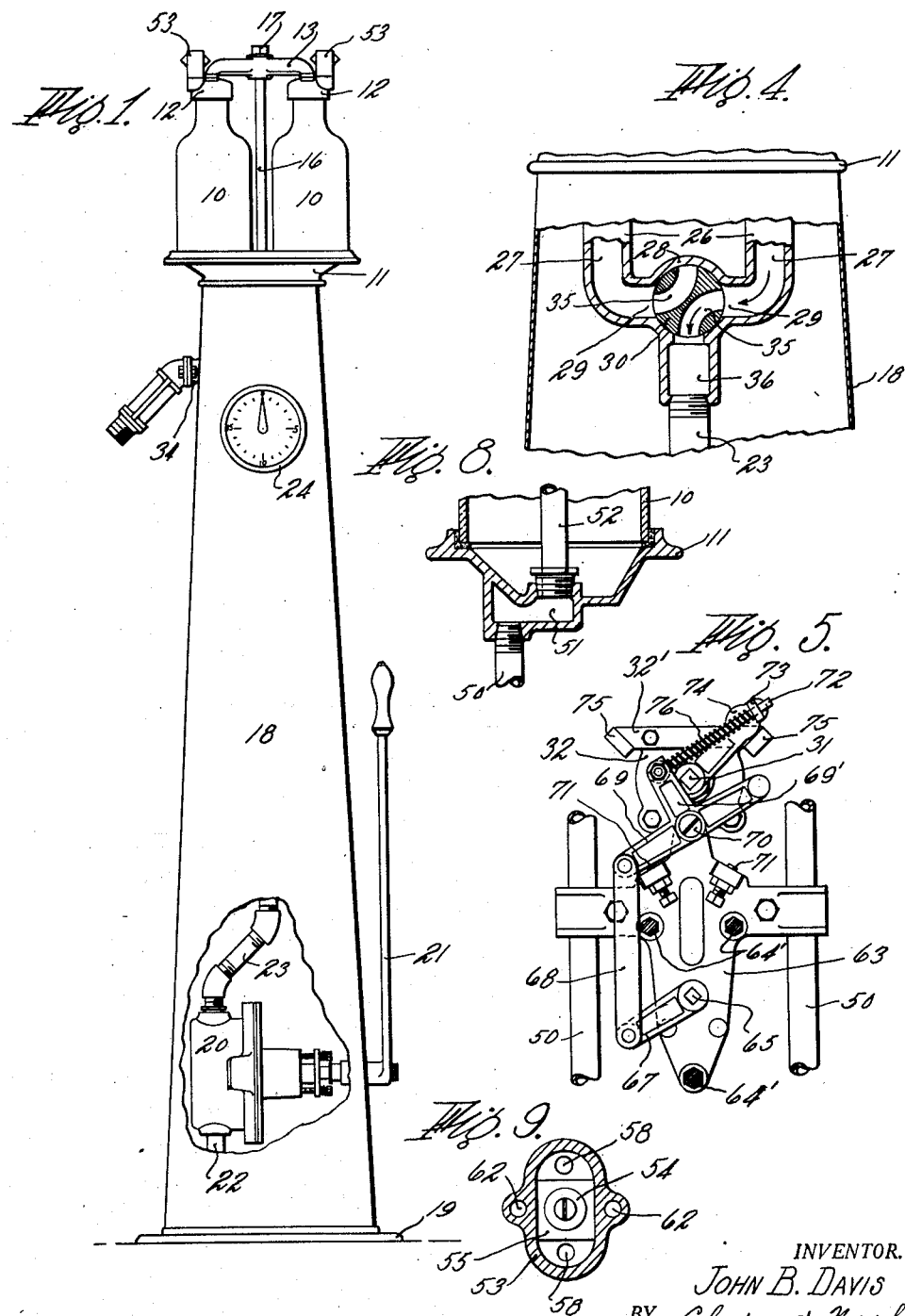

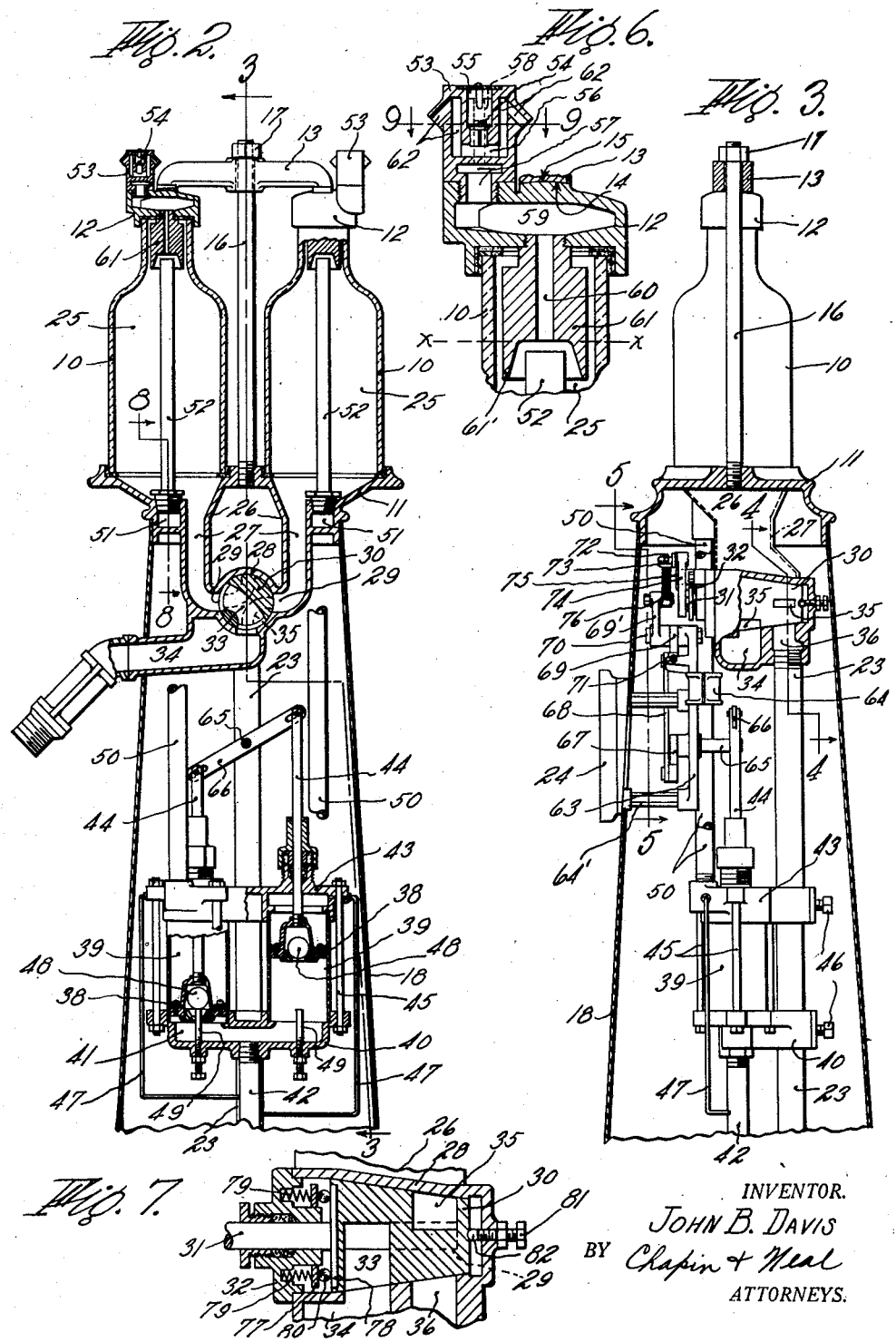

1,749,469

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed September 7, 1927. Serial No. 218,087.

This invention relates to improvements in liquid dispensing apparatus, such as is adapted for use in dispensing gasoline, oils and the like.

The particular class of dispensing apparatus, with which the invention is concerned, is that wherein a pair of measuring cylinders are provided and arranged so that one can be filled while the other discharges and wherein the connection of the cylinders to the supply and discharge conduits is effected automatically by valve mechanism conditioned for its operation on the establishment of fluid pressure by the act of filling a measuring chamber with liquid. The essential point is to secure the automatic actuation of the valve mechanism only in the event of the presence of liquid to a predetermined level in a measuring chamber.

There are several examples of apparatus of this particular class to be found in the prior art, characterized by the utilization of fluid pressure in various ways to effect automatic operation of the valve mechanism which controls the filling and discharging of the measuring chambers.

My invention has for its general object to provide an improved apparatus of this particular class wherein the fluid pressure built up during the filling of a measuring chamber is utilized in a novel way to effect operation of the valve mechanism.

Another object of the invention is to provide an apparatus in which the usual air escape valves for the measuring chambers, float controlled or otherwise, may be avoided and yet enable automatic action of the valve mechanism to be secured only in the event of the presence of liquid to a predetermined level in the measuring chamber.

Other objects are to provide an improved valve mechanism for the purpose described; to provide improved means for actuating the valve mechanism; and to provide an improved construction and arrangement of the measuring cylinders.

Other objects and advantages will appear in the following description and be pointed out in the appended claims.

The invention will be disclosed with reference to the accompanying drawings, in which:

Fig. 1 is an exterior elevational view, with parts broken away, of a liquid dispensing apparatus embodying my invention;

Fig. 2 is a sectional elevational view thereof;

Fig. 3 is a cross sectional view taken on the line 3—3 of Fig. 2;

Fig. 4 is a fragmentary sectional view, taken on the line 4—4 of Fig. 3;

Fig. 5 is a fragmentary view taken on the line 5—5 of Fig. 3;

Fig. 6 is a fragmentary sectional view, drawn to a larger scale, showing the construction at the upper end of one of the measuring cylinders together with the air admission valve and passages;

Fig. 7 is a longitudinal sectional view of the combined inlet and discharge valve;

Fig. 8 is a fragmentary sectional view taken on the line 8—8 of Fig. 2; and

Fig. 9 is a sectional plan view taken on the line 9—9 of Fig. 6.

The apparatus includes two measuring cylinders 10, preferably of glass and bottle-shaped as indicated. These cylinders, which are open at their lower ends, are mounted side by side on a common base member 11 which is formed with suitable seats, as shown, to receive said lower ends. The upper end of each cylinder is closed by a cap 12. A cross bar 13 extends from one cap to the other, its ends being provided with concave seats 14 (Fig. 6) which bear upon convex bearing portions 15 formed on caps 12. A stud 16, secured to the member 11, extends upwardly between the cylinders 10 and centrally and loosely through the cross bar 13. A nut 17, threaded on the upper end of stud 16, serves to force the cross bar downwardly and press its ends against the caps 12, whereby the cylinders 10 are clamped to member 11. The seats 14 and 15 allow a certain amount of tilting of the cross bar to compensate for the slight variations in height of the glass cylinders, which are frequently found to vary in this respect.

The base member 11 is supported on the upper end of a hollow pedestal 18, herein shown as a sheet metal casing. Such casing, at its lower end, is secured to a base 19 (Fig. 1). This casing houses the valve mechanism which controls the supply to and discharge from the cylinders 10 as well as the operating mechanism therefor. It may also house any suitable type of pump, such as that shown at 20 in Fig. 1, which may be operated manually or otherwise in any suitable way. As shown, the pump is adapted to be manually operated by a lever 21 disposed outside the casing. The pump 20 is adapted to be connected to a source of liquid supply, such as an underground tank, for example, by a pipe 22. The outlet of the pump is connected to a pipe 23 which extends upwardly within casing 18 for connection to the valve mechanism, above referred to. The casing 18 may carry on its exterior a register, indicated conventionally at 24, for counting the number of operations of the valve mechanism.

The cylinders 10, in cooperation with the base member 11, afford measuring chambers 25. The member 11 is formed with two parallel tubular depending parts 26 of approximately rectangular cross section, which afford passages 27, one for each chamber 25. Each passage alternately serves for the inflow and outflow of liquid. These two parts 26 are joined by a valve casing 28 with which the passages 27 communicate by means of ports 29 disposed on opposite sides thereof. The casing 28 is closed at its rear end and is formed to receive a tapered plug valve 30, having an operating shaft 31 extending through a stuffing box in a cap 32, which is secured to the casing and serves to close the otherwise open front end thereof. Valve 30 has a curved passage 33 extending therethrough near the front end thereof, which passage is adapted alternately to connect the passages 27 to a discharge passage or conduit 34 formed in member 11. Valve 30 is likewise provided near the rear end thereof with two curved passages 35 (Fig. 4), one of which serves to connect one passage 27 to a supply passage 36, formed in member 11, whenever the other passage 27 is connected by passage 33 to the discharge passage 34. The other passage 35 serves to connect the last named passage 27 to supply passage 36 whenever the first named passage 27 is connected by passage 33 to the discharge passage 34. The supply passage 36 is connected to the outlet of pump 20 by a pipe 23,—this pipe and passage constituting a supply conduit. The passage 34 extends outside casing 18 for connection to the usual delivery hose (not shown). The valve 30 is adapted to turn through an angle of substantially ninety degrees and in a counterclockwise direction from one extreme position, such as is shown in Figs. 2 and 4, to a second extreme position in which the connections of the supply and discharge conduits to the measuring chambers are reversed. This valve is adapted to be intermittently moved back and forth between these two positions by suitable quick-acting mechanism to be later described. It never dwells intermediate its extreme positions. The arrangement is a familiar one and such that while one chamber 25 is being supplied with liquid the other chamber is discharging the liquid previously supplied thereto.

As a means for automatically operating the valve 30, I provide two pistons 38 (Fig. 2), which reciprocate in cylinders 39, disposed side by side and housed within casing 18 below the valve casing 28. These cylinders have a common lower head 40 provided with a passage 41 which is always in communication with the lower end of both cylinders and which is connected to a drain pipe 42, usually leading back into the underground supply tank. Such passage and pipe constitute a drain conduit. The cylinders 39 likewise have a common upper head 43 through which the piston rods 44 pass. The heads 40 and 43 are connected by tie bolts 45 in the usual manner and are supported from the supply pipe 23, being clamped thereto by set screws 46, as indicated in Fig. 3. The upper ends of the cylinders 39 do not directly communicate. Each cylinder is, however, connected by a vent tube 47 to the drain pipe 42 and these vent tubes, which are of relatively small bore in comparison to the bore of pipe 42, are connected to the latter at vertically spaced points to minimize any tendency of a flow from one to the other. Each piston 38 has a suitable valve, such as the ball valve 48, which is arranged to be lifted away from its seat when the piston nears the end of its downward stroke. This result is effected by the ball 48 striking upon the upper end of a stop pin 49, which is adjustably secured, as by the screw threads shown, to the lower head 40. As the piston rises, the ball eventually moves out of contact with its pin 49 and drops by gravity into its seat in the piston.

The upper end of each cylinder 39 is connected to the upper end of the overlying measuring chamber 25. This connection is effected by a pipe 50 which connects the upper head 43 to a cored chamber 51 formed in member 11, and by a pipe 52 which communicates with such chamber and extends vertically upwards in chamber 25, terminating in the upper neck portion of the chamber. The pipes 50 and 52 with chamber 51 constitute an overflow conduit. In Figs. 2 and 3, the pipes 50 are broken away to a certain extent but these figures clearly show the manner in which these pipes are connected to their respective cylinders. Fig. 8 clearly shows the way in which one set of the pipes 50 and 52 is connected to the cored passage 51.

The upper and bottle-necked end of each measuring chamber is of much less cross sectional area than the body or lower portion. Such end is sealed against the escape of air or liquid except by way of pipe 52. Each cap 12 is provided with an air vent valve fitting 53 having air admission passages and a controlling valve 54, but this valve opens only to enable the discharge of liquid from the measuring chamber 25. That is, the valve 54 is strictly an air admission valve, opening by atmospheric pressure whenever a condition of partial vacuum exists in chamber 25 and venting the chamber to permit liquid to drain therefrom. The fitting 53 has three chambers, designated 55, 56 and 57. The upper chamber 55 is connected to the lower chamber 57 by two vertical passages 58 (best shown in Fig. 9) and the lower chamber communicates with the measuring chamber 25 by means of a chamber or passage 59 in cap 12 and a vertical passage 60 formed in a cylindrical member 61 which is secured to and depends from cap 12 into the upper end of the measuring cylinder. The valve 54 controls the communication between the upper and intermediate chambers 55 and 56 and the latter is connected to the atmosphere by two passages 62. The upper face of valve 54 is thus subjected to the pressure existing in chamber 25 and the lower face to atmospheric pressure. Accordingly, when a condition of partial vacuum exists in chamber 25, valve 54 is forced upwardly to allow air to flow into chamber 25. The member 61 materially reduces the effective volume of the upper end of each cylinder and leaves little space in such end for air or liquid. It also serves as a hood for the intake end of overflow pipe 52 by reason of the flange 61' which depends from its lower face in encompassing but slightly spaced relation with the upper end of said pipe.

During the operation of filling one of the measuring chambers, the incoming liquid expels air by way of the pipe 52. Not all the air is expelled for as soon as the liquid rises above the top of pipe 52, the air in the upper end of the measuring cylinder and in the passages and chambers in cap 12 is trapped and unable to escape by way of pipe 52. Liquid flows down pipe 52 after the expulsion of air. While there is a constantly open vent for the measuring chamber in the shape of tube 47, this vent is obviously not large enough to carry off all of the fluid, which passes down pipes 52 and 50, and a pressure is thereby built up on piston 38 to force the same downwardly. This downward movement of the piston is made to actuate the valve 30, not directly but by intervening mechanism which causes an extremely rapid movement of the valve.

Such mechanism is best shown in Fig. 5. It is mounted on a supporting frame 63 which is secured by clamps 64 (one of which is shown in Fig. 3) to the two pipes 50. The register 24 may also be supported from frame 63 by the posts 64', as shown in Fig. 3. In the lower end of frame 63, a shaft 65 is mounted and this shaft extends behind the frame and is fixed to the central portion of a lever 66 (see Figs. 2 and 3). This shaft is oscillated first by one piston 38 and then by the other. As shown, it will next be rocked in a clockwise direction by the right hand piston 38. The motion of shaft 65 is communicated by a lever 67, fixed thereto, and a link 68 to one arm of a bell crank 69, which is mounted to turn on a stud 70 fixed to frame 63. Said arm of the bell crank and the diametrically opposed arm thereof cooperate alternately with fixed but adjustable stops 71 mounted in frame 63, whereby the extent of angular movement of the bell crank under the action of the pistons 38 is controlled. The third and right angularly outstanding arm, marked 69', of the bell crank 69, has pivotally connected to its outer end a rod 72. This rod is freely slidable in a lug 73 which is mounted for free turning movement in one end of a lever 74. The other end of lever 74 is fixed to the shaft 31 of a valve 30. The lever 74 is limited in its rocking movement by stops 75, in the shape of lugs formed on a bar 32' secured to cap 32. When lever 74 is positioned as shown, valve 30 occupies one extreme position, being that shown in Fig. 2. When moved in a counterclockwise direction until it abuts the other stop 75, the valve 30 will occupy its other extreme position which is such that passage 33 connects the right hand passage 27 to passage 34. The valve lever 74 is not moved directly by the linkage, which is operated by piston 38 but through the medium of a spring 76, encompassing rod 72 and acting between lever 69' and lug 73. The piston-operated linkage simply stresses this spring and after it has been sufficiently stressed, moves it into position so that it can act to turn arm 74 and effect a sudden turning of the valves from one extreme position to the other. As arm 69' swings in a clockwise direction, spring 76 is compressed between it and lug 73. The pressure of the spring then holds arm 74 against lug 75 and maintains it in the extreme position shown. Arm 74 cannot move until the center of the pivotal connection between arm 74 and rod 72 crosses to the right of a line connecting the center of stud 70 and the center of lug 73. When this occurs, the force, previously built up in spring 76, is so directed as to move arm 74 in a counterclockwise direction and move it rapidly, and at a speed independent of that of the piston 38 and connected parts, into its other extreme position.

The operation, as thus described, is that effected by the right hand piston 38 shown in Fig. 2. As that piston descends it raises the left hand piston into position to act. The left hand piston, when forced downwardly will rock shaft 65 in a counterclockwise direction. This causes spring 76 to be again stressed and thereafter positioned so that it can act to turn arm 74 in a clockwise direction and reverse valve 30. The valve action is extremely rapid. With the particular arrangement of the passages shown in valve 30, it is possible, when the valve occupies an intermediate position, for both chambers 25 to be simultaneously connected to the discharge passage 34 and for one chamber to be connected to the supply passage 36 at the same time. Such a condition would be fatal if the valve were turned slowly but does not interfere with the accuracy of measurement in this case because the valve moves so rapidly that no appreciable leakage can occur. Also it always moves at the same speed so that any leakage, if occurring from this source, is constant.

While valve 30 may be variously constructed as desired, I have found the construction illustrated in Fig. 7 suitable for practical manufacture and satisfactory for commercial use. Such a valve is of the tapered plug type with spring means for forcing it into its tapering socket. To enable the valve to be turned easily, I interpose a ball bearing between the spring means and the valve. Thus, the valve carries one ring 78 of the ball bearing and the other ring 77 is slidable on the inwardly projecting hub of cap 32. A series of springs 79 act between cap 32 and ring 77 forcing the latter against the balls 80 and forcing the balls 80 against ring 78. To keep the valve from sticking, a screw 81 is threaded into the closed rear wall of the valve housing 28 and the inner end of this screw carries a ball 82. By adjustment of the screw, the ball 82 is made to press against the back end of valve 30 and just "crack" it off its tapering seat. The ball 82 minimizes the frictional resistance on valve imposed by this arrangement.

The operation of the apparatus will now be described. In common with several other types of liquid dispensing apparatus, the general operation is the same to the extent that, while one cylinder 10 is being filled, the other is discharging and that the filling of one to a predetermined degree causes the automatic reversal of the controlling valve. The operation, however, differs in detail and principally in the particular way in which the controlling valve is made to operate automatically when a cylinder is filled to the desired degree. In this particular case, the liquid overflowing from the measuring cylinder is utilized under the pressure built up during the filling of the measuring chamber to put into action the spring device for operating the valve. The valve does not trip immediately that the liquid rises to a predetermined height in the cylinder, but only after a certain amount of the pumped liquid has passed down the overflow conduit. However, when the valve does trip, there is a predetermined measured quantity, say for example one gallon, in the measuring chamber. At the start of the filling operation, the liquid rising in cylinder 10 displaces air and drives it down into the overflow conduit and into the upper end of the cylinder 39 therebelow. Some of this air, and I believe the greater part of it, escapes through the constantly open vent tube 47 which forms a by-pass around piston 38. This by-pass, however, cannot discharge air as fast as it is forced down the overflow conduit and the air becomes compressed. A test with a gauge will show that before liquid enters pipe 52, an appreciable pressure of air is built up. This pressure, however, is relieved because it is expended in moving piston 38 downward for the initial part of its stroke. By proper proportioning of the size of the vent tube with respect to the size of the overflow conduit, the air pressure, that can be built up during the filling of cylinder 10 with liquid, is insufficient to operate piston 38 far enough to trip the spring device for operating the valve. When, however, liquid enters the overflow conduit, a second pressure is built up and, due to the incompressibility of the liquid, this pressure can be rapidly built up and to a degree sufficient to move piston 38 the remainder of its stroke and cause the valve to be turned by the spring device. By measuring the liquid delivered from drain pipe 42 during the downward movement of one piston 38, it is found to be a substantial amount and enough to fill all of the overflow conduit and part of cylinder 39. Thus the valve 30 does not move when liquid reaches a certain level in cylinder 10 but only after it has reached this level and remained there long enough to fill the overflow connections and a substantial part of cylinder 39. Of course, some air will be trapped in cylinder 39 and some liquid will pass out through by-pass 47, but the fact remains that the valve will not trip until liquid has entered the overflow conduit, thus insuring the presence of liquid to the desired level in cylinder 10.

It is not essential that the cylinder be entirely filled with liquid before valve 30 is turned to discharge the contents of the cylinder. Accuracy of measurement within commercial tolerances can be secured with the arrangement shown herein where the cylinders 10 are never entirely filled with liquid. When the liquid rises, say to the level x—x in Fig. 6, the upper part of the bottle-necked end of cylinder 10 contains air which is trapped and cannot escape. The annular space between the inner wall of cylinder 10 and the outer surface of member 61 contains trapped air as does the passage 60. The volume of such space and passage is relatively small because of the member 61. Of course, air is also trapped in chambers 55, 57, and 59 and passages 58. This trapped air will be compressed of course by the pumping pressure. The point to note, however, is that the valve 30 is tripped only when a predetermined pressure is created and since the tripping pressure is always the same the extent of compression of the air trapped in the upper end of cylinder 10 is the same, wherefore at the time of tripping of valve 30 the liquid will lie at a predetermined level in the cylinder. Even variations in this level would not seriously affect the accuracy of measurement because of the smallness of the cross-sectional area of the annular space referred to. It is to be noted that any liquid, which may enter part way into passage 60, will after valve 30 is tripped pass into pipe 52. Therefore, it is only the volume of liquid in the annular space which, if varied, might affect the measurement, but any variation which might occur is so small as to be well within commercial tolerances.

It has been described that a substantial preliminary pressure due to compression of the air is built up which causes a partial operation of piston 38. This pressure is not necessary although it is useful because it causes a partial operation of the valve tripping mechanism so that less work is left to do by the overflow liquid, wherefore the tripping of the valve occurs perhaps a little sooner than it otherwise would. This pressure can be cut down materially by increasing the drain opening in piston 38. In the initial operation of the apparatus no substantial pressure of air is shown, but succeeding operations do show such pressure, indicating that all the liquid does not drain from cylinders 38. Therefore, enlargement of the drain opening should avoid the creation of a substantial air pressure if this is desired. Incomplete drainage of cylinders 38 would tend to result in an increasing accumulation of liquid in the cylinders but for the fact that any excess is carried off by the vent tube 47 when the piston is at rest in its upper position. It will thus be seen that the preliminary operation of piston 38 by the compressed air is not essential for all purposes.

The invention provides for an apparatus, which will dispense liquids with sufficiently close accuracy for commercial purposes and at the same time eliminate some of the features which have heretofore been deemed important as making for accuracy. For example, no valve-controlled, air-escape valve is used and no means for controlling such a valve so that entire filling of the measuring chamber is effected. Neither need the combined liquid supply and discharge valve be so made as to entirely cut off the discharge for one measuring chamber before connecting it to the supply or before connecting the other cylinder to the discharge. The rapidity of movement of the valve prevents any serious discrepancy in measurement from this source. At the same time, the invention affords a means for automatically operating the combined supply and discharge valve which is conditioned upon the presence of liquid to a certain level in the measuring chamber and is not otherwise effective. While liquid overflowing from a measuring cylinder has heretofore been used for operating a combined liquid supply and discharge valve, the present invention affords an improved means for utilizing such liquid in which a single conduit receives both air and liquid displaced from the measuring chamber and yet the air, even though under pressure, is prevented from operating the controlling valve.

The prevention of actuation of the valve by air pressure alone is effected in part by the constant but restricted vent and partly by the remoteness of cylinders 39 from the measuring chamber. The remoteness of these cylinders means a larger volume, due to the overflow conduit, than would otherwise be available in which to compress air. It is possible, by gauging the volume in the overflow conduit and cylinders and the strength of spring 76, to prevent the operation of the valve by air pressure even though no vent, such as 47, is employed. Therefore, the invention, in all its aspects, is not confined to the vent or bypass feature although such feature is important and preferred.

Other features of the invention have individual importance aside from use in the particular combination described. The valve and its operating mechanism, the construction and arrangement of the measuring cylinders may be used in other apparatus of this general class.

The invention has been disclosed herein in an embodiment at present preferred, for illustrative purposes, but the scope of the invention is defined by the appended claims rather than by the foregoing description.

What I claim is:

1. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, means adapted to be first stressed and then released to quickly shift the valve means and reverse the connections of said chambers to said conduits, an overflow conduit for each chamber communicating therewith near the upper end thereof, a cylinder connected near one end to each overflow conduit, a piston in each cylinder adapted to be moved by fluid under pressure from said overflow conduit, means alternately operated by said pistons for stressing and then releasing said valve shifting means, and means for discharging fluid from each cylinder through its piston after the latter has been moved by the fluid to effect the shifting of said valve means.

2. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, resilient means arranged to be first stressed and then released to quickly shift the valve means and reverse the connections of said chambers to said conduits, an overflow conduit for each chamber communicating therewith near the upper end thereof, a cylinder connected near one end to each overflow conduit, a piston in each cylinder adapted to be moved by fluid under pressure from said overflow conduit, means alternately operated by said pistons for stressing and then releasing said valve shifting means, and means for discharging fluid from said end of each cylinder after its piston has been moved by the fluid to effect the shifting of said valve means.

3. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, resilient means arranged to be first stressed and then released to quickly shift the valve means and reverse the connections of said chambers to said conduits, an overflow conduit for each chamber communicating therewith near the upper end thereof, a cylinder connected near one end to each overflow conduit, a piston in each cylinder adapted to be moved by fluid under pressure from said overflow conduit, means alternately operated by said pistons for stressing and then releasing said valve shifting means, each piston having a passage therethrough, a valve normally closing said passage, a drain conduit communicating with the other end of each cylinder, and means for opening the valve of each piston after the piston has been moved a predetermined distance toward the last named end of its cylinder.

4. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, resilient means arranged to be first stressed and then released to quickly shift the valve means and reverse the connections of said chambers to said conduits, an overflow conduit for each chamber communicating therewith near the upper end thereof, a cylinder connected near one end to each overflow conduit, a piston in each cylinder adapted to be moved by fluid under pressure from said overflow conduit, means alternately operated by said pistons for stressing and then releasing said valve shifting means, said chambers except for said conduits being closed against the escape of air or liquid therefrom, and a constantly open vent passage provided for the first named end of each cylinder and of less cross sectional area than said overflow conduit.

5. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, resilient means arranged to be first stressed and then released to quickly shift the valve means and reverse the connections of said chambers to said conduits, an overflow conduit for each chamber communicating therewith near the upper end thereof, a cylinder connected near one end to each overflow conduit, a piston in each cylinder adapted to be moved by fluid under pressure from said overflow conduit, means alternately operated by said pistons for stressing and then releasing said valve shifting means, means for discharging fluid from said end of each cylinder after its piston has been moved by the fluid to effect the shifting of said valve means, a drain conduit into which the liquid thus discharged passes, and a by-pass conduit providing for constant but restricted communication between the first named end of each cylinder and said drain conduit.

6. In a liquid dispensing apparatus, a pair of measuring chambers each having a passage leading into its lower end for the supply and discharge of liquid and being otherwise closed against the inflow or outflow of fluid into or from such lower end, the upper end of each chamber being of relatively small cross sectional area with respect to its lower end, an overflow conduit for each chamber including a pipe passing upwardly into said chamber and terminating near the upper part thereof with its intake located in the region of small cross sectional area, a cap closing the upper end of each chamber except for an air admission passage provided therein, a valve for closing the air admission passage except when the pressure in its chamber is less than atmospheric, a member depending from each cap into the small upper end of its chamber and materially reducing the volume of the air space in said end, said member forming a hood for the open end of the overflow tube, a liquid supply conduit, a liquid discharge conduit, valve means for alternately connecting the first named passages to the supply and discharge conduits and for connecting one passage to the discharge conduit while the other passage is connected to the supply conduit, and means operable by fluid under pressure from said overflow conduit for actuating said valve means.

7. In a liquid dispensing apparatus, a pair of measuring chambers each having a passage leading into its lower end for the supply and discharge of liquid and being otherwise closed against the inflow or outflow of fluid into or from such lower end, the upper end of each chamber being of relatively small cross sectional area with respect to its lower end, an overflow conduit for each chamber including a pipe passing upwardly into said chamber and terminating near the upper part thereof with its intake located in the region of small cross sectional area, a cap closing the upper end of each chamber except for an air admission passage provided therein, a valve for closing the air admission passage except when the pressure in its chamber is less than atmospheric, a member depending from each cap into the small upper end of its chamber and materially reducing the volume of the air space in said end, said member having its lower face overlying the open end of said overflow pipe in closely adjacent relation therewith and a passage extending from said face to said air admission passage, said member also having an annular rim depending from said face and encompassing the periphery of the upper part of said overflow pipe in spaced but adjacent relation therewith, a liquid supply conduit, a liquid discharge conduit, valve means for alternately connecting the first named passages to the supply and discharge conduits and for connecting one passage to the discharge conduit while the other passage is connected to the supply conduit, and means operable by fluid under pressure from said overflow conduit for actuating said valve means.

8. In a liquid dispensing apparatus, a base member, a pair of glass cylinders open at opposite ends and having their lower ends resting on said member, a cap for closing the upper end of each cylinder, a cross bar extending from one cap to the other with its ends overlying and pressing against said caps, means acting centrally on the cross bar for drawing it downwardly towards said member to clamp the cylinders thereto, said caps and the ends of said cross bar having coacting surfaces so formed as to permit the bar to tilt to compensate for variations in height of said cylinders.

9. A liquid dispensing apparatus, comprising, two measuring chambers, a conduit through which liquid may be supplied thereto, a conduit through which liquid may be discharged therefrom, valve means for alternately connecting said chambers to the supply and discharge conduits arranged so that while one chamber is connected to the supply conduit the other is connected to the discharge conduit, means for supplying liquid under pressure through the supply conduit, an overflow conduit for each chamber communicating therewith near the upper end thereof, a cylinder connected near one end to each overflow conduit, a piston in each cylinder movable by fluid under pressure from said overflow conduit, a lever oscillatable between two extreme positions for actuating said valve means, a lever arranged to be rocked from one extreme position to another alternately by said pistons, a rod connecting said levers having a pivotal connection with one and a slidable connection with the other, and a spring interposed between said levers and arranged to be stressed by the rocking movement of the second lever, said spring while being stressed acting to maintain the first lever in one extreme position and being movable at the end of the stressing movement into position to rapidly move the first lever into its other extreme position.

In testimony whereof I have affixed my signature.

JOHN B. DAVIS.